(12) United States Patent
Homma (10) Patent No.: US 11,112,236 B2
(45) Date of Patent: Sep. 7, 2021

(54) OPTICAL DISPLACEMENT METER

(71) Applicant: Keyence Corporation, Osaka (JP)

(72) Inventor: Tatsuro Homma, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 64 days.

(21) Appl. No.: 16/823,365

(22) Filed: Mar. 19, 2020

(65) Prior Publication Data

US 2020/0340800 A1    Oct. 29, 2020

(30) Foreign Application Priority Data

Apr. 26, 2019  (JP) .............................. JP2019-085201

(51) Int. Cl.
*G01B 11/06* (2006.01)
*G01B 11/04* (2006.01)

(52) U.S. Cl.
CPC .......... *G01B 11/0608* (2013.01); *G01B 11/04* (2013.01); *G01B 11/0691* (2013.01)

(58) Field of Classification Search
CPC ... G01B 11/0608; G01B 11/04; G01B 11/002; G01B 11/026; G01B 11/24; G01N 21/8806; G01N 21/8901; G01N 21/892; G01N 21/95; G06T 17/00
See application file for complete search history.

(56) References Cited

U.S. PATENT DOCUMENTS

| | | | | |
|---|---|---|---|---|
| 3,695,771 A | * | 10/1972 | Bardos ............... | G01B 11/0608 356/446 |
| 4,097,159 A | * | 6/1978 | Strandberg ............ | G01B 11/02 356/612 |
| 2017/0328032 A1 | * | 11/2017 | Matsuo ..................... | G06T 7/55 |
| 2019/0154439 A1 | * | 5/2019 | Binder ..................... | G01S 15/08 |
| 2019/0249981 A1 | * | 8/2019 | Hosokawa .............. | B29C 70/20 |
| 2020/0049487 A1 | * | 2/2020 | Tsuchida ................ | G01B 11/24 |
| 2020/0049490 A1 | * | 2/2020 | Tsuchida ................ | G01B 11/25 |

FOREIGN PATENT DOCUMENTS

| | | |
|---|---|---|
| JP | 200896125 A | 4/2008 |
| JP | 2012103266 A | 5/2012 |

OTHER PUBLICATIONS

U.S. Appl. No. 16/823,363, filed Mar. 19, 2020 (40 pages).
U.S. Appl. No. 16/823,364, filed Mar. 19, 2020 (41 pages).
U.S. Appl. No. 16/823,366, filed Mar. 19, 2020 (83 pages).

\* cited by examiner

*Primary Examiner* — Kara E. Geisel
*Assistant Examiner* — Jarreas C Underwood
(74) *Attorney, Agent, or Firm* — Kilyk & Bowersox, P.L.L.C.

(57) ABSTRACT

The optical displacement meter generates, from each position of a plurality of pixel rows in a U direction and a peak position in a V direction, a plurality of profiles of the X-Z cross section, and measures a three-dimensional shape of the measuring object based on the plurality of profiles acquired at different positions in the Y direction. The optical displacement meter determines, based on whether a profile exists in a blind spot region in which it is impossible to measure a height which occurs in a Y-Z cross section corresponding to an angle formed between a light projecting axis of a light projecting section and a light receiving axis of an image sensor based on a principle of triangulation, a part of the three-dimensional shape generated by a measuring unit as an erroneous detection value.

5 Claims, 12 Drawing Sheets

OPTICAL DISPLACEMENT METER

CROSS-REFERENCE TO RELATED APPLICATIONS

The present application claims foreign priority based on Japanese Patent Application No. 2019-085201, filed Apr. 26, 2019, the contents of which are incorporated herein by reference.

BACKGROUND OF THE INVENTION

1. Field of the Invention

The present invention relates to an optical displacement meter.

2. Description of Related Art

An optical displacement meter of a light sectioning method has been proposed in order to measure a height in a Z direction of a measuring object (workpiece) conveyed in a Y direction by a conveyor (JP-A-2008-096125, JP-A-2012-103266).

A direction orthogonal to the Y direction and the Z direction is an X direction, and the workpiece is placed on an XY plane. The optical displacement meter irradiates the workpiece with slit light having a width in the X direction, and receives reflected light from the workpiece with an image sensor arranged two-dimensionally. A light projecting direction of the slit light and a light receiving direction of the image sensor are inclined, and the height of the workpiece is calculated based on a principle of triangulation. Such an optical displacement meter of the light sectioning method can acquire a contour (profile) of an X-Z cross section of the workpiece at once. By repeatedly performing imaging while conveying the workpiece in the Y direction, profiles at different positions in the Y direction are acquired. Further, data indicating a three-dimensional shape of the workpiece is obtained from a plurality of profiles.

SUMMARY OF THE INVENTION

By the way, as the measurement accuracy required for the optical displacement meter becomes higher, there is a possibility that a measurement error which has been negligible conventionally becomes apparent. The optical displacement meter measures a height of a workpiece using the principle of triangulation. As a result, a blind spot region that cannot be measured occurs in the Y direction in principle, and a false measurement result occurs in the blind spot region in cases. Therefore, an object of the invention is to determine a part of a three-dimensional shape as an erroneous detection value in an optical displacement meter of a light sectioning method.

The invention provides, for example, an optical displacement meter of a light sectioning method which measures a profile of an X-Z cross section of a measuring object conveyed in a Y direction based on a principle of triangulation, the optical displacement meter including a light projecting section that scans slit light or spot light having a width in an X direction to irradiate the measuring object; an image sensor that receives reflected light from the measuring object, the image sensor having a plurality of pixels two-dimensionally arranged in a U direction corresponding to the X direction and a V direction corresponding to a Z direction, and outputting a light receiving amount of the reflected light by the plurality of pixels; a detecting unit that detects, as a peak position, a position of a pixel in the V direction that is a peak of the light receiving amount for each of a plurality of pixel rows arranged in the U direction; a measuring unit that acquires, from each position of the plurality of pixel rows in the U direction and the peak position in the V direction, a plurality of profiles of the X-Z cross section at different positions in the Y direction, and measures a three-dimensional shape of the measuring object based on the acquired plurality of profiles; and a determining unit that determines, based on whether a profile exists in a blind spot region in which it is impossible to measure a height which occurs in a Y-Z cross section corresponding to an angle formed between a light projecting axis of the light projecting section and a light receiving axis of the image sensor based on the principle of triangulation, a part of the three-dimensional shape generated by the measuring unit as an erroneous detection value.

According to the invention, it is possible to determine a part of a three-dimensional shape as an erroneous detection value based on whether a profile exists in a blind spot region in which it is impossible to measure a height which occurs based on a principle of the three-dimensional shape.

DESCRIPTION OF EMBODIMENTS

Embodiments will be described in detail below with reference to the attached drawings. The following embodiments are not intended to limit the invention according to the claims, and all combinations of features described in the embodiments are not necessarily essential to the invention. Two or more features of a plurality of features described in the embodiments may be arbitrarily combined. In addition, same or similar components are given the same reference numeral, and redundant description is omitted.

<Optical Displacement Meter>

Figure 1:
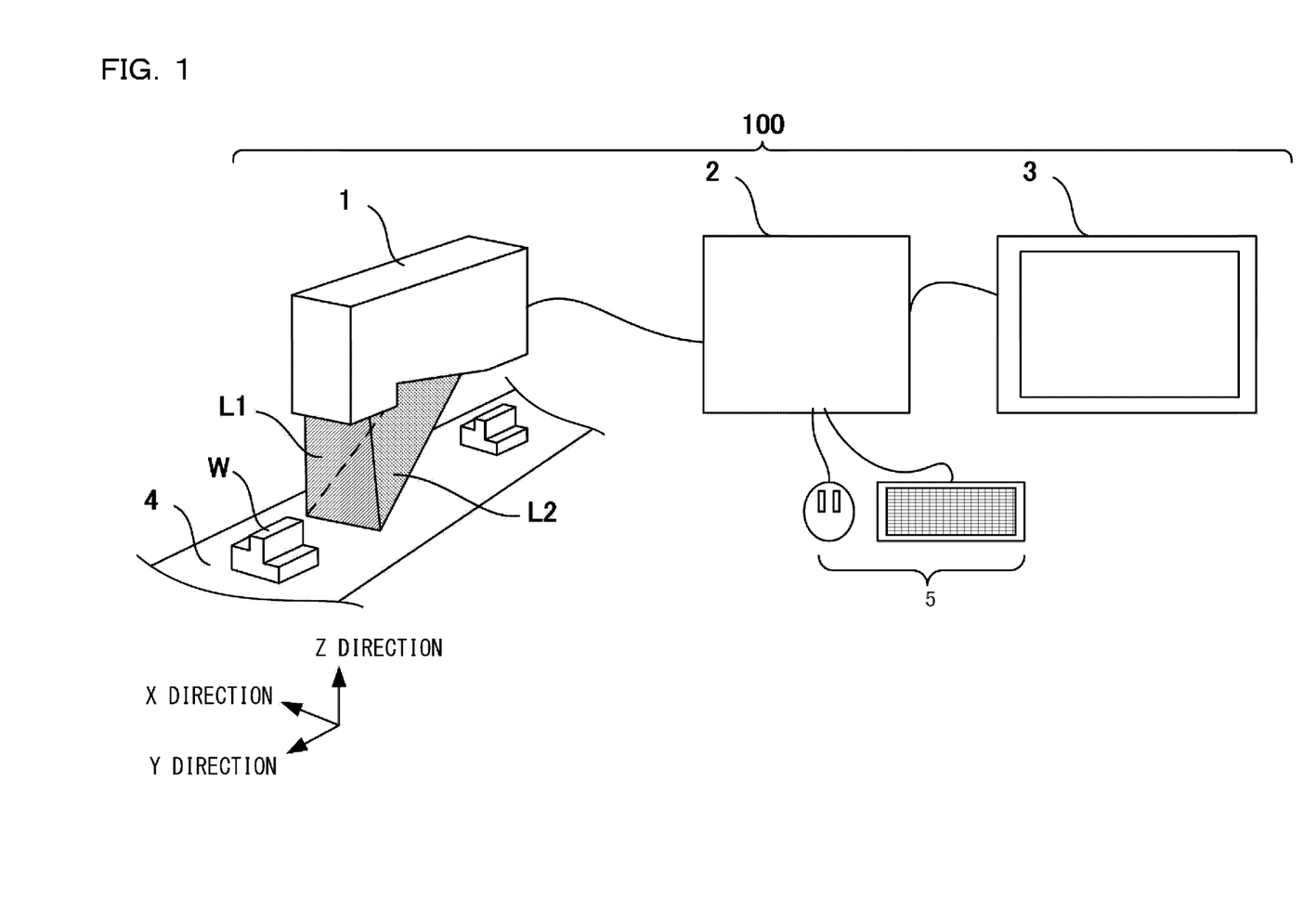
FIG. 1 is a diagram illustrating an optical displacement meter.

FIG. 1 is a diagram showing an optical displacement meter 100. The optical displacement meter 100 is an apparatus that measures a profile and a three-dimensional shape of a workpiece W conveyed in a Y direction by a belt conveyor 4. In this example, a Z direction corresponds to a height direction of the workpiece W. Ahead section 1 outputs slit light L1 parallel to an XZ plane and receives reflected light L2 from the workpiece W, thereby outputting a light receiving result to a control section 2. The control section 2 calculates a profile of the workpiece W based on the light receiving result output from the head section 1. The control section 2 may be integrated with the head section 1. The profile is data indicating an outer edge of a cut surface of the workpiece W parallel to the XZ plane. For example, the profile is an aggregate of (xi, zi) (i is an index). The xi indicates a position in the X direction. The zi indicates a height in the Z direction. The three-dimensional shape is an aggregate of (xi, yi, zi). The yi indicates a position in the Y direction. The control section 2 obtains profiles (xi, zi) of the workpiece W having different yis by causing the head section 1 to perform imaging at regular intervals. A display section 3 displays a measurement result of the workpiece W by the optical displacement meter 100, and displays a UI (user interface) for performing a setting of the optical displacement meter 100. An operating section 5 is an input device for receiving a user input to the optical displacement meter 100.

<Principle of Three-Dimensional Distance Measurement>

Figure 2:
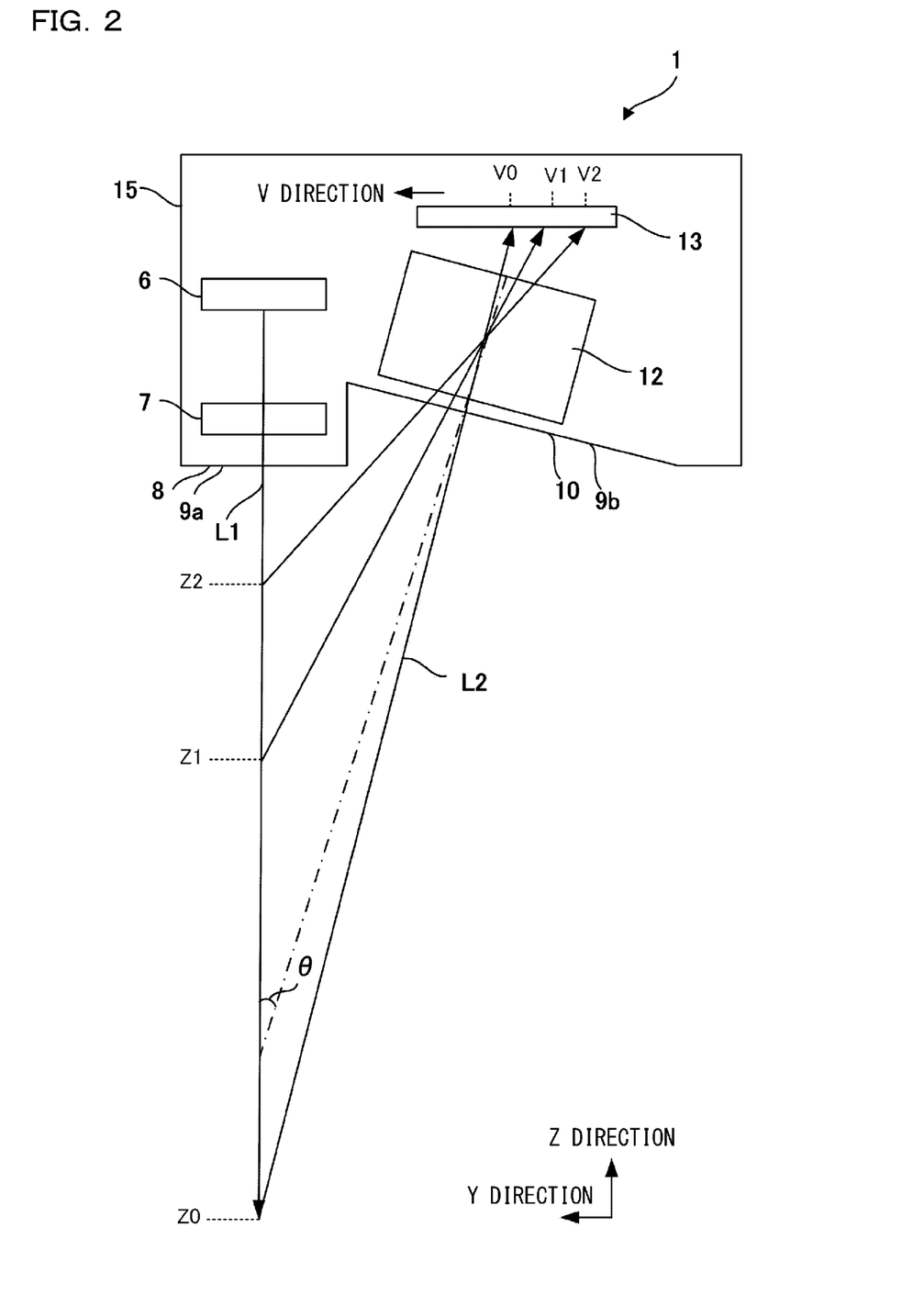
FIG. 2 is a diagram illustrating the principle of triangulation.

FIG. 2 is a diagram illustrating a principle of a light sectioning method (triangulation). A light source 6, a light projecting lens 7, a light receiving lens 12, and an image sensor 13 are integrated inside a housing 15 of the head section 1. Light output from the light source 6 is converted into the slit light L1 by passing through the light projecting lens 7. A light transmitting window 8 through which the slit light L1 passes is provided on the housing 15. A light transmitting glass 9a for dust proof is provided on the light transmitting window 8. Similarly, a light receiving window 10 for guiding the reflected light L2 into the interior of the housing 15 is provided on the housing 15. A light transmitting glass 9b for dust proof is provided on the light receiving window 10. The light receiving lens 12 is a lens for forming an image of the reflected light L2 on the image sensor 13. The image sensor 13 is a sensor having a plurality of pixels (which may be called light receiving elements or photoelectric converting elements) arranged two-dimensionally. As shown in FIG. 2, a light receiving axis of the image sensor 13 is inclined by an angle θ relative to a light projecting axis of the light source 6. That is, the reflected light L2 from a height Z0 forms an image at a position of V0 in the V direction of the image sensor 13. The reflected light L2 from a height Z1 forms an image at a position of V1 in the V direction of the image sensor 13. The reflected light L2 from a height Z2 forms an image at a position of V2 in the V direction of the image sensor 13. In this way, the V direction of the image sensor 13 corresponds to the Z direction of the workpiece W. Although the U direction of the image sensor 13 is not shown, the U direction corresponds to the X direction of the workpiece W. In a word, a vertical direction of an image which is a light receiving result output by the image sensor 13 is the V direction, and a lateral direction is the U direction.

The light source 6 is arranged such that the slit light L1 is output in the Z-axis direction in FIG. 2. However, the positional relation between the pair of the light source 6 and the light projecting lens 7, and the pair of the image sensor 13 and an imaging lens 12 may be reversed.

Figure 3:
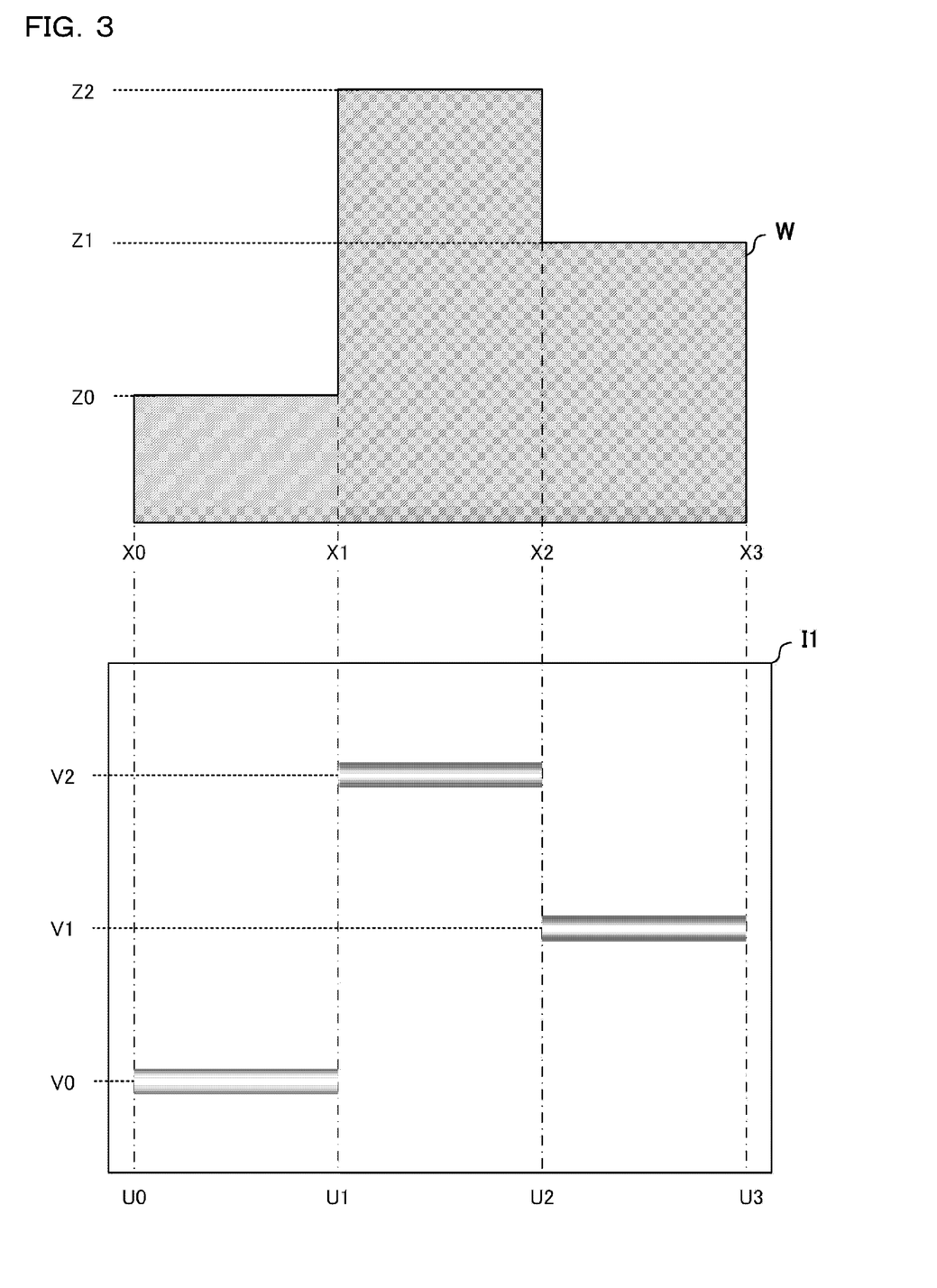
FIG. 3 is a diagram illustrating a measurement of a profile.

FIG. 3 is a diagram illustrating a relation between an image I1 output by the image sensor 13 and a cross section of the workpiece W. In this example, the height in the XZ cross section of the workpiece W changes in three stages. More specifically, the height from position X0 to position X1 in the X direction is Z0. The height from the position X1 to position X2 is Z2. The height from the position X2 to position X3 is Z1. The image I1 is an image obtained by imaging such a workpiece W with the head section 1. The U direction (lateral direction) of the image I1 corresponds to the X direction of the workpiece W. That is, positions U0, U1, U2, and U3 of the image I1 correspond to positions X0, X1, X2, and X3, respectively. Similarly, positions V0, V1, and V2 in the V direction of the image I1 correspond to heights Z0, Z1, and Z2, respectively. A light spot (an aggregate of reflection positions) formed by the incidence of the slit light L1 on the XY plane is linear. That is, when the workpiece W is not present on the belt conveyor 4, substantially linear light spots are arranged on the image output by the head section 1. On the other hand, generally a height of an edge of a cut surface of the workpiece W is often not constant. In this case, as shown in FIG. 3, the light spots are arranged at positions in the V direction corresponding to each of a plurality of heights. FIG. 2 shows that the position in the V direction changes corresponding to the height. The control section 2 generates a profile by calculating a position in the V direction for each position in the U direction from an image IM acquired at a position in a certain Y direction. Since there is a certain scale relation between the XZ coordinate system and the UV coordinate system, the control section 2 can convert a profile in the UV coordinate system into a profile in the XZ coordinate system by a simple calculation.

<Position (Height Calculation)>

Figure 4:
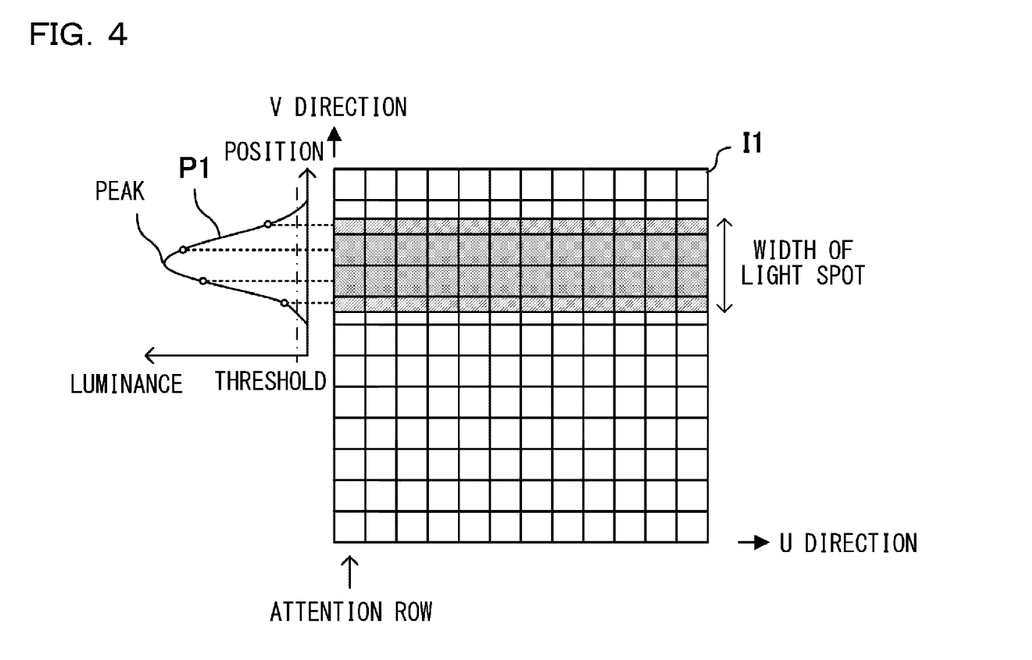
FIG. 4 is a diagram illustrating a method of detecting a peak position.

FIG. 4 is a diagram illustrating a method of calculating a height included in the profile from the image I1. The slit light L1 has a certain width in the Y direction. For this reason, the width of the light spot brought by the reflected light L2 to the image sensor 13 also becomes a width that extends over a plurality of pixels. Therefore, the control section 2 obtains an approximate curve P1 indicating a change in the luminance value from the luminance value of each pixel, and calculates a position in the V direction which brings a peak value in the approximate curve P1. In FIG. 4, the leftmost row is an attention row, and a distribution of the luminance values of the attention row (the approximate curve P1) is illustrated. The approximate curve P1 is obtained by performing curve fitting on a plurality of sample values and the like. A sample value which is smaller than a detection threshold is not considered. The position in the V direction which brings the peak value indicates the height of the workpiece W. The control section 2 obtains the approximate curve P1 for each position (each pixel row) in the U direction, and calculates a position (height) in the V direction that brings a peak value from the approximate curve P1. By executing the arithmetic processing at each position in the U direction, one profile is obtained. Such arithmetic processing may be called sub-pixel processing.

<Erroneous Detection of Height Due to the Principle of Triangulation>

Figure 5:
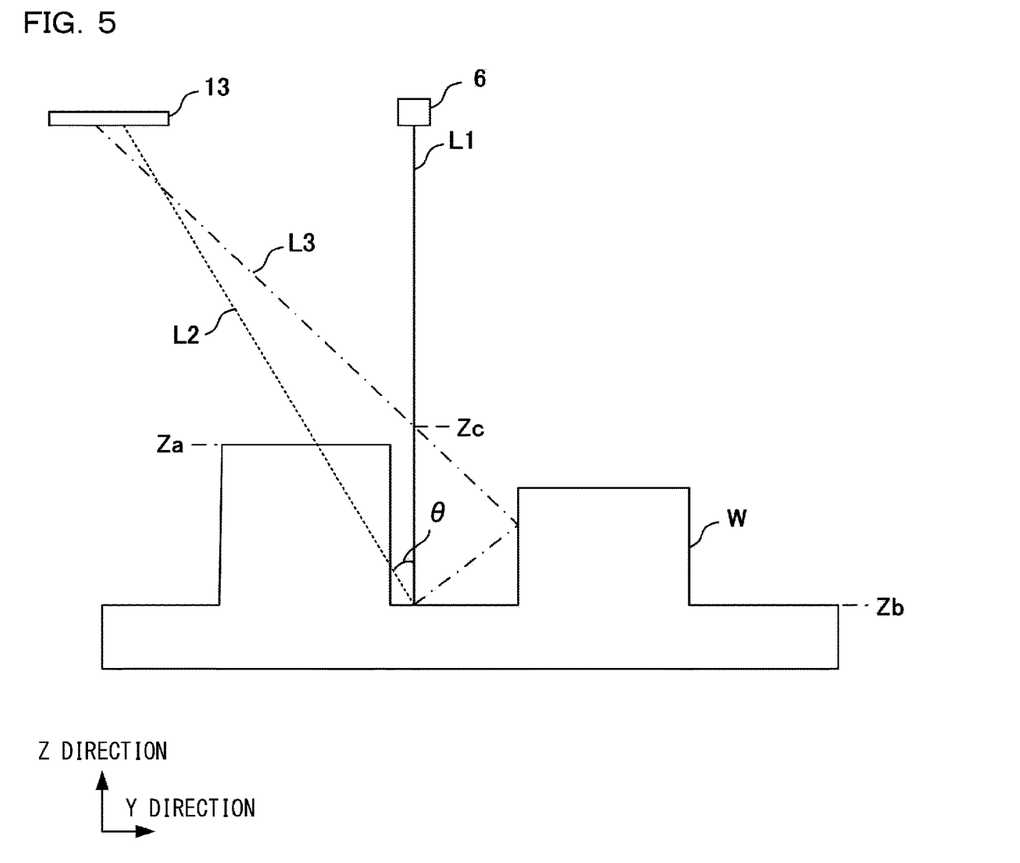
FIG. 5 is a diagram illustrating a principle of generation of an erroneous profile.

FIG. 5 is a diagram illustrating an erroneous detection of a height due to the principle of triangulation. As described above, in triangulation, a predetermined angle θ exists between an optical axis of the slit light L1 and an optical axis of the reflected light L2. Therefore, there is a shape whose height cannot be measured in principle. When the workpiece W as shown in FIG. 5 is irradiated with the slit light L1, the reflected light L2 advances in a direction forming an angle θ with the slit light L1. However, since a part of the workpiece W is present in the direction in which the reflected light L2 advances, the reflected light L2 is blocked and does not reach the image sensor 13. On the other hand, a false reflected light L3 which occurred due to multiple reflection may be incident on the image sensor 13. In particular, when a metal or the like having a high reflectance exists on a surface of the workpiece W, such multiple reflection is likely to occur. The reflected light L3 is incident on the image sensor 13 as if it were the reflected light reflected at a height of Zc. Of course, the original height is Zb.

Figure 6:
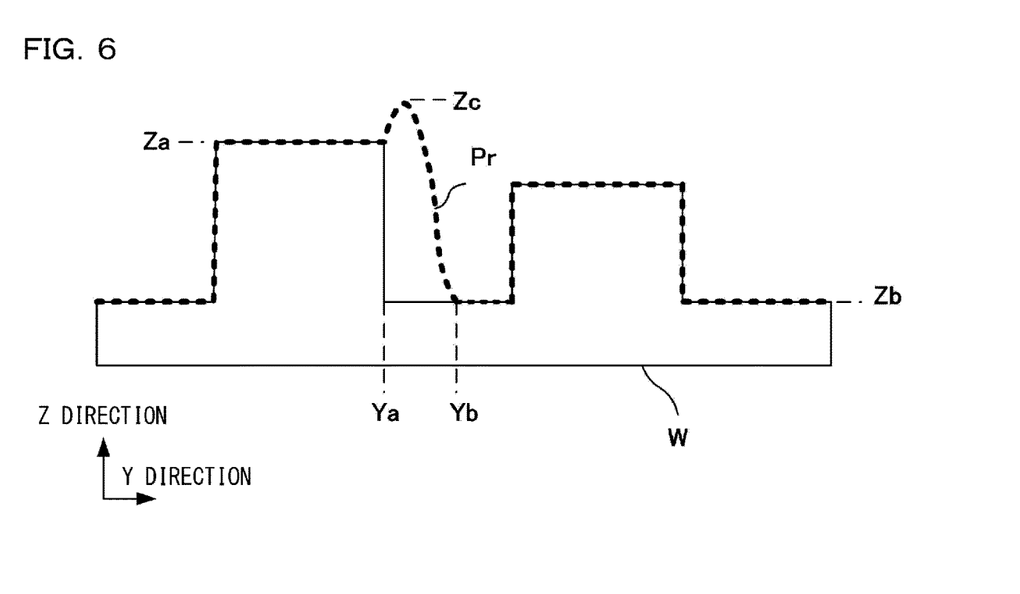
FIG. 6 is a diagram illustrating an erroneous profile.

FIG. 6 shows a profile Pr generated based on an erroneous height measurement value. As shown in FIG. 6, a section from position Ya to position Yb in the Y direction is a blind spot section where no measurement value can be obtained in the principle of triangulation. Nevertheless, due to the multiple reflected light L3, a protrusion of a height Zc is generated in the profile Pr of the workpiece W in the blind spot section.

Figure 7:
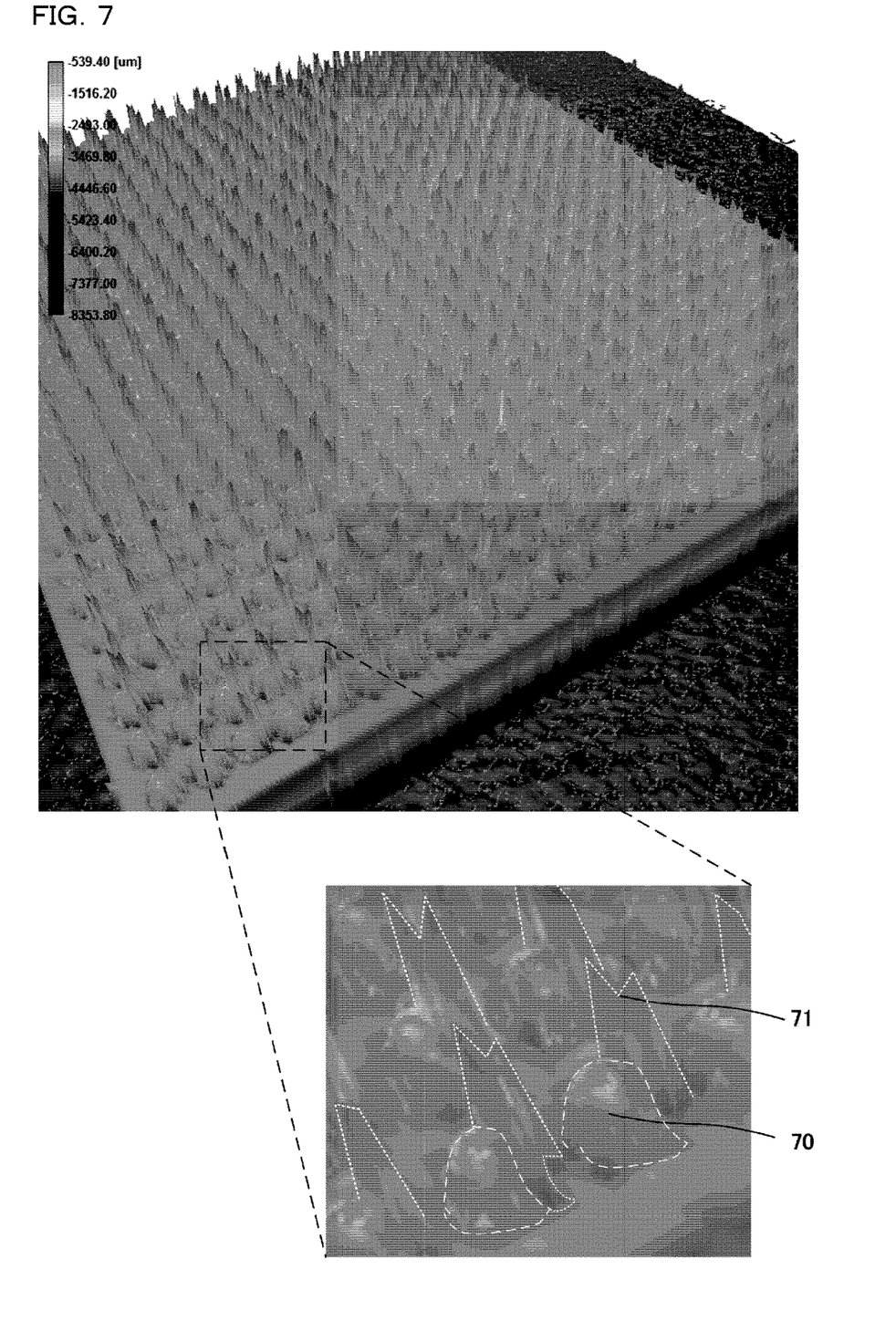
FIG. 7 is a diagram illustrating an erroneous profile.

FIG. 7 shows a measurement result of a three-dimensional shape of a ball grid array (BGA). As is well known, a BGA is employed as a terminal of a CPU (Central Processing Unit), etc. Since heights of a plurality of solder balls 70 need to be constant, the optical displacement meter 100 determines whether the height of each solder ball 70 satisfies a tolerance. However, as shown in FIG. 7, a protrusion 71 may occur on the solder ball 70 due to an erroneous detection. Although the protrusion 71 does not exist on an actual solder ball 70, the protrusion 71 appears in a measurement result. The protrusion 71 occurs above the blind spot section.

<Method of Deleting Erroneously Detected Measurement Result>

Figure 8:
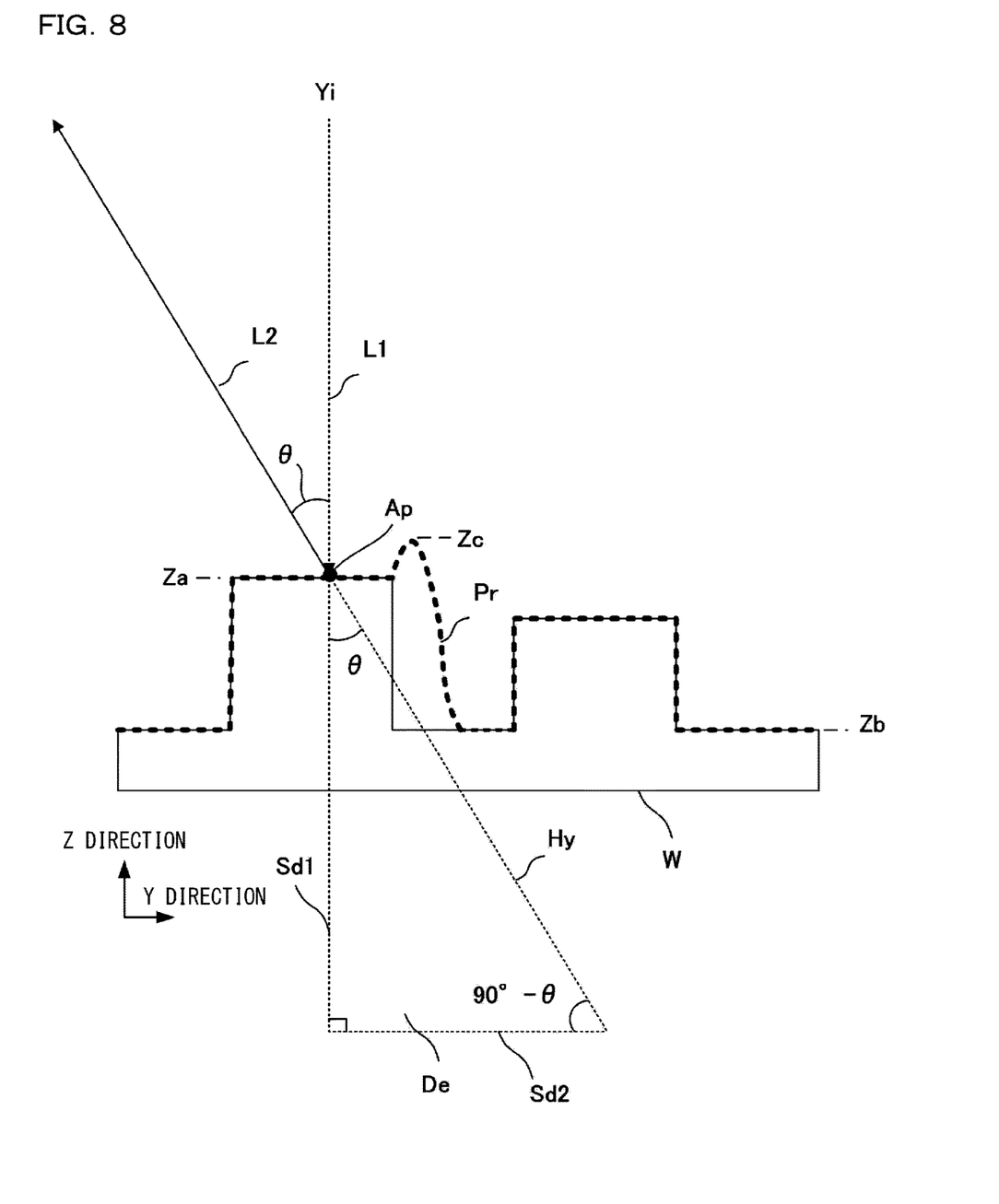
FIG. 8 is a diagram illustrating a blind spot region.

FIG. 8 is a diagram illustrating a method of determining that a measurement value is a correctly detected measurement value. When a measurement of a three-dimensional shape of the workpiece W is completed based on the peak detection, a measurement result of the height at a plurality of sampling points (measurement points) in the Y direction is obtained. Here, the measurement result of the height at a certain sampling point Yi is Za. Therefore, a blind spot region De of a right-angled triangle formed by extending a light projecting axis of the slit light L1 and an axis of the ideal reflected light L2 with respect to the coordinate (Yi, Za) is considered. Among a first side Sd1 and a second side Sd2 forming a right angle, the first side Sd1 is a line segment existing in a direction in which the light projecting axis of the slit light L1 is extended. The second side Sd2 is a line segment in an XY plane. A hypotenuse Hy is a line segment existing in a direction in which a light receiving axis (the reflected light L2) of the image sensor 13 is extended. An angle formed between the first side Sd1 and the hypotenuse Hy is $\theta$. An angle formed between the second side Sd2 and the hypotenuse Hy is $90°-\theta$. A vertex Ap of the right-angled triangle is an attention measurement point of a determination target. When the measurement result Za for the sampling point Yi is a correct measurement value (true value), there should be no measurement results for other sampling points in the blind spot region De. In an example shown in FIG. 8, there is no measurement result existing inside the blind spot region De, and thus it is understood that the measurement result Za for the sampling point Yi is a correct measurement value.

Figure 9:
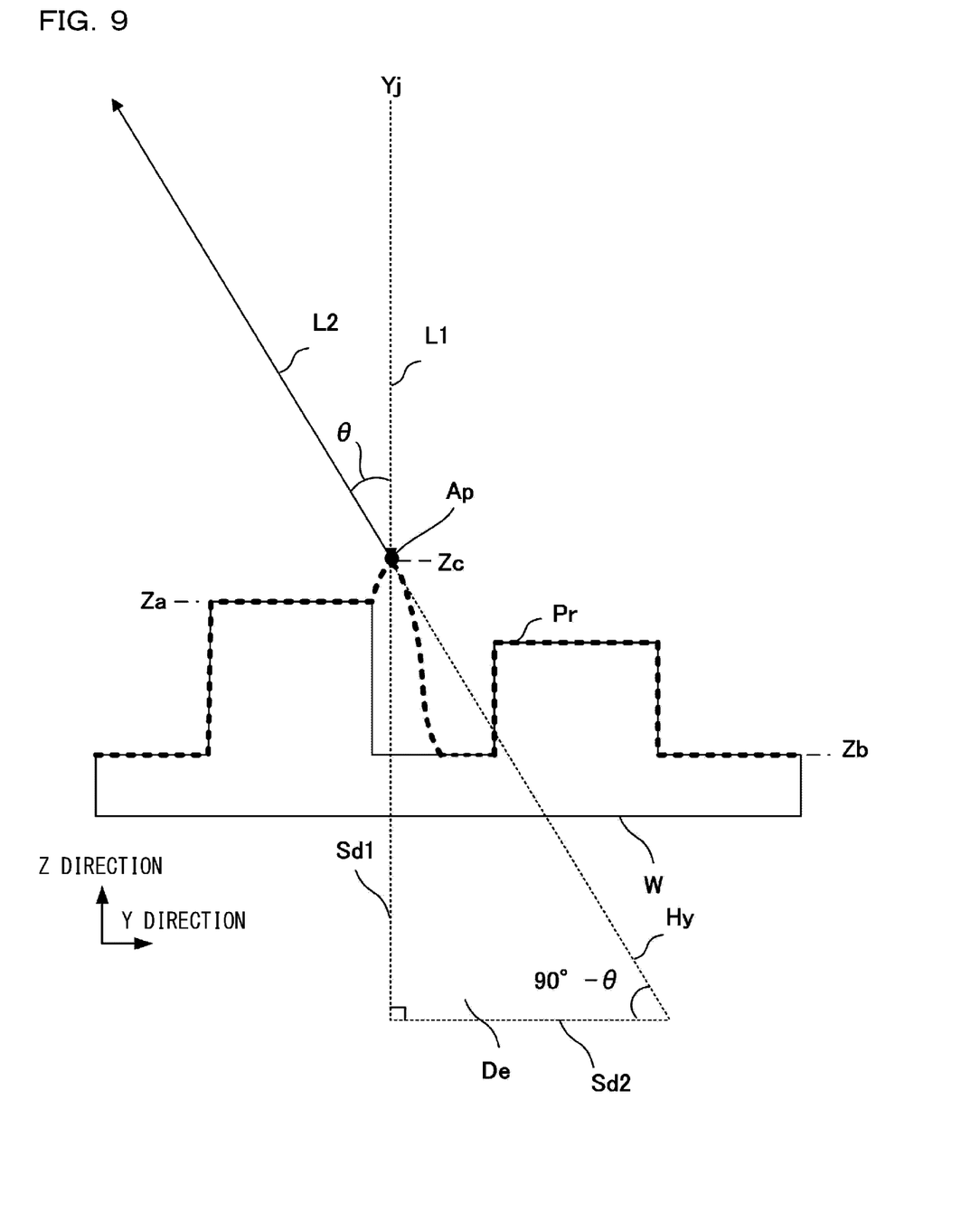
FIG. 9 is a diagram illustrating a blind spot region.

FIG. 9 is a diagram illustrating a method of deleting a measurement value of an erroneous detection. Here, the measurement result of the height at a certain sampling point Yj is Zc. Therefore, when the blind spot region De of a right-angled triangle with the coordinate (Yj, Zc) as the vertex Ap is set, it can be seen that a measurement result indicated by broken lines exists inside the blind spot region De. As a result, it is understood that the measurement result Zc of the height for the sampling point Yj is an erroneous detection. The method of setting the blind spot region De is as described with reference to FIG. 8.

Figure 10:
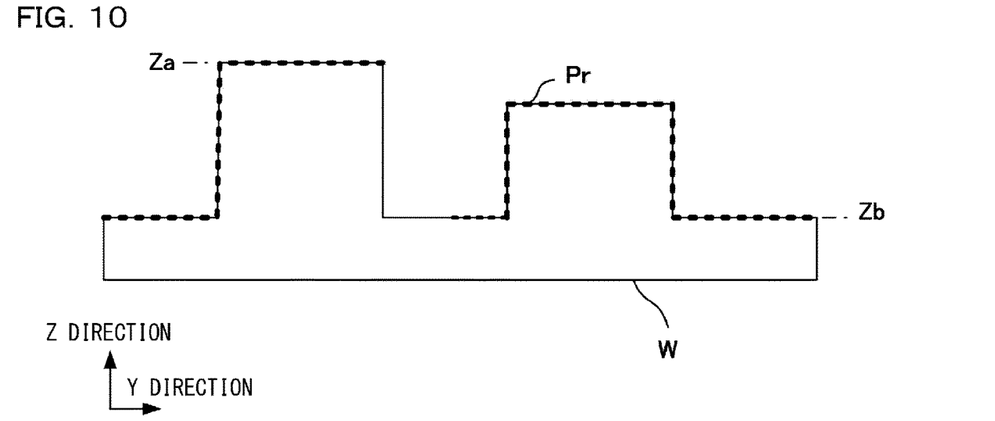
FIG. 10 is a diagram illustrating that an erroneous measurement result has been deleted.
Figure 11:
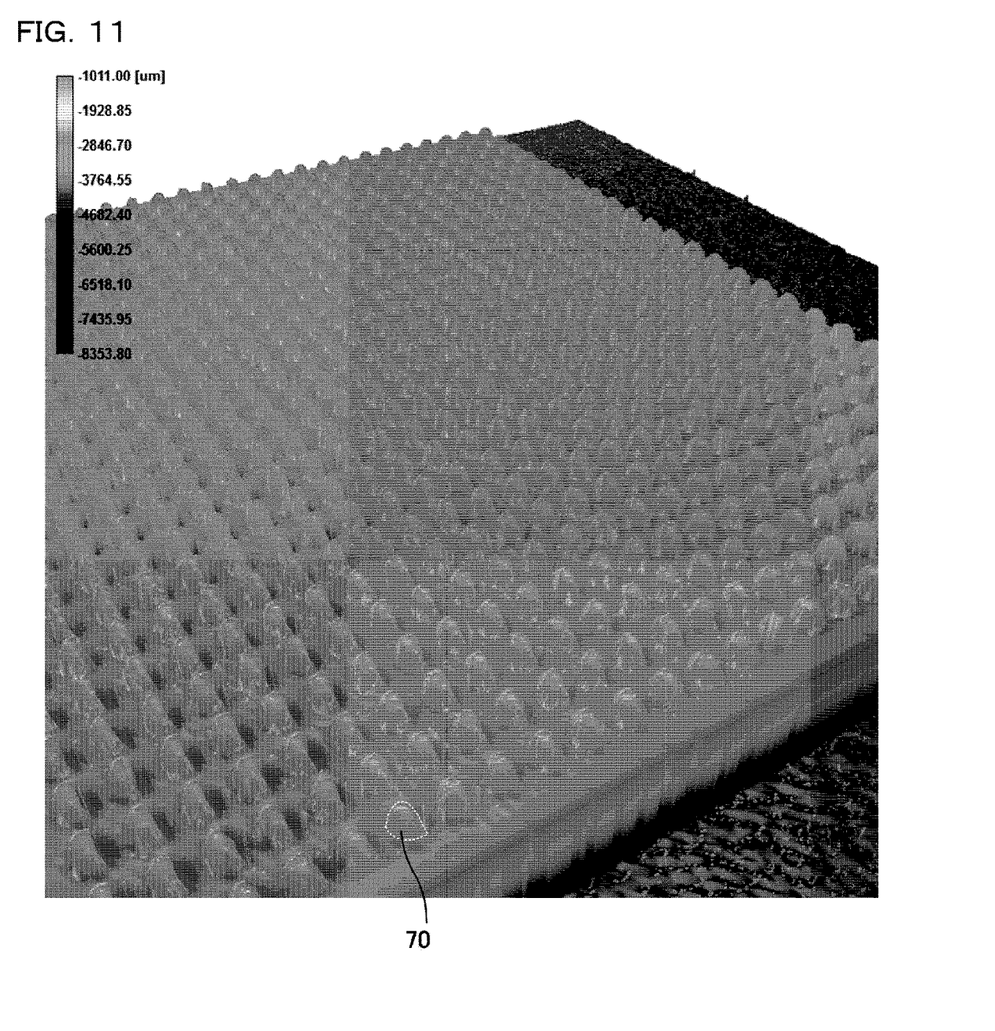
FIG. 11 is a diagram illustrating a corrected three-dimensional shape.

FIG. 10 shows an example in which an erroneously detected measurement result is deleted. It can be seen that the aforementioned erroneous protrusions have been eliminated. FIG. 11 shows an example in which an erroneously detected measurement result for BGA is deleted. Comparing FIG. 11 with FIG. 7, it can be seen that the protrusion 71 due to the erroneous detection that was present in FIG. 7 is eliminated in FIG. 11.

<Internal Function>

Figure 12:
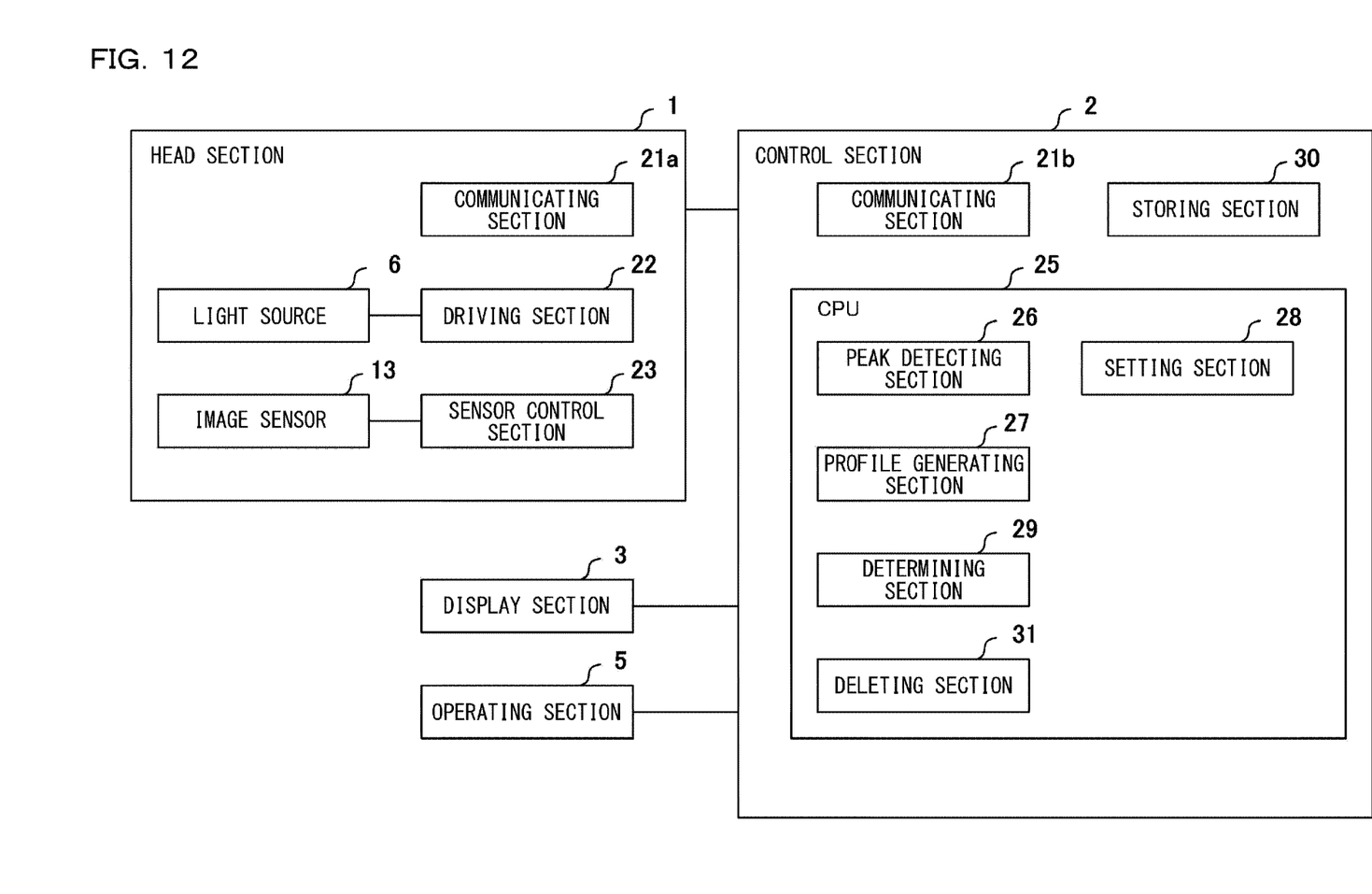
FIG. 12 is a block diagram illustrating functions included in the optical displacement meter.

FIG. 12 shows internal functions of the optical displacement meter 100. A communicating section 21a of the head section 1 is a communication circuit for communicating with the control section 2. A driving section 22 is a driving circuit that turns on the light source 6 by supplying a driving current to the light source 6 according to an instruction from the control section 2 received via the communicating section 21a. A sensor control section 23 is a control circuit that causes the image sensor 13 to perform imaging with a predetermined exposure time according to an instruction from the control section 2 received via the communicating section 21a. In the present embodiment, the sensor control section 23 causes the image sensor 13 to execute predetermined binning according to an instruction from the control section 2 received via the communicating section 21a.

A communicating section 21b of the control section 2 is a communication circuit for communicating with the head section 1. A CPU 25 controls the head section 1 by executing a control program stored in a storing section 30, and measures a profile and a three-dimensional shape of the workpiece W based on a light receiving result output from the head section 1. A peak detecting section 26 detects a position (peak position) in the V direction which brings a peak of a luminance value based on the light receiving result output by the image sensor 13. The peak position corresponds to the height of the workpiece W. In a word, the peak detecting section 26 obtains a height of the workpiece W at each position in the X direction by calculation. A profile generating section 27 generates one profile data by collecting the height (zi) of the workpiece W for each position (xi) in the X direction obtained by the peak detecting section 26. That is, one profile data is an aggregate of a plurality of heights (zi). The profile generating section 27 obtains profile data for different positions (yj) in the Y direction, and generates data indicating a three-dimensional shape of the workpiece W from the obtained plurality of profile data. The data of the three-dimensional shape may be described as (xi, yj, zij). Here, i and j are indexes. The data of the three-dimensional shape of the workpiece W is an aggregate of the obtained plurality of profile data.

A setting unit 28 determines the blind spot region De for an attention measurement point based on a height of the workpiece W at the attention measurement point among a plurality of measurement points arranged in the Y direction included in the data of the three-dimensional shape of the workpiece W, the light receiving axis of the image sensor 13, and a light projecting direction of the light source 6. In the optical displacement meter 100, a profile of a cross section parallel to an XZ plane is measured at once. However, in determining an erroneous measurement result, a plurality of measurement results included in a profile in the YZ cross section become determination targets. An optical axis of the light receiving lens 12 that makes the reflected light L2 from the workpiece W form an image on a light receiving surface of the image sensor 13 is the light receiving axis of the image sensor 13. As shown in FIG. 8, the blind spot region De is a right-angled triangle having the attention measurement point as one vertex Ap. Of the first side Sd1 and the second side Sd2 forming a right angle in the right-angled triangle, the first side Sd1 is parallel to the Z direction, and the second side Sd2 is parallel to the Y direction. The hypotenuse Hy of the right-angled triangle which is the blind spot region De is parallel to the optical axis of the light receiving lens 12. As described above, the blind spot region De is a region in which it is impossible to measure a height which occurs in the Y-Z cross section corresponding to the angle θ formed between the light projecting axis of the light source 6 and the light receiving axis of the image sensor 13 based on the principle of triangulation.

A determining section 29 determines whether the measurement result of the attention measurement point is erroneous based on whether the profile Pr (measurement result) exists in the blind spot region De of the attention measurement point. In other words, the determining section 29 determines, among a plurality of profiles included in the data of the three-dimensional shape of the workpiece W, a part of the three-dimensional shape as an erroneous detection value based on whether the profile Pr (measurement result) exists in the blind spot region De of the attention measurement point. The determining section 29 may also determine whether the profile of the attention measurement point is an erroneous profile (erroneous detection value) based on whether a height of the workpiece W at a measurement point measured before the attention measurement point belongs to the blind spot region De. The determining section 29 may also determine whether the profile of the attention measurement point is an erroneous profile (erroneous detection value) based on whether a height of the workpiece W at a measurement point measured after the attention measurement point belongs to the blind spot region De. Here, it is presumed that the workpiece W is conveyed in +Y direction, the light source 6 exists in the +Y direction, and the image sensor 13 exists in −Y direction. When the workpiece W is conveyed in the −Y direction, the determining section 29 determines whether a height of the workpiece W at a measurement point measured after the attention measurement point belongs to the blind spot region De.

A deleting section 31 deletes a profile (measurement result) that has been determined as an erroneous profile by the determining section 29 among the plurality of profiles included in the data of the three-dimensional shape of the workpiece W. Note that the entire profile Pr may be deleted, or an erroneous measurement result of the profile Pr may be deleted. Deleting a profile in this way refers to deleting at least an erroneous measurement result among the measurement results of a plurality of measurement points included in one profile data.

A profile generating section 27 excludes the erroneous profile (erroneous detection value) among a plurality of profiles to generate or correct the data of the three-dimensional shape of the workpiece W.

<Consideration of Numerical Aperture of Light Receiving Lens>

Figure 13:
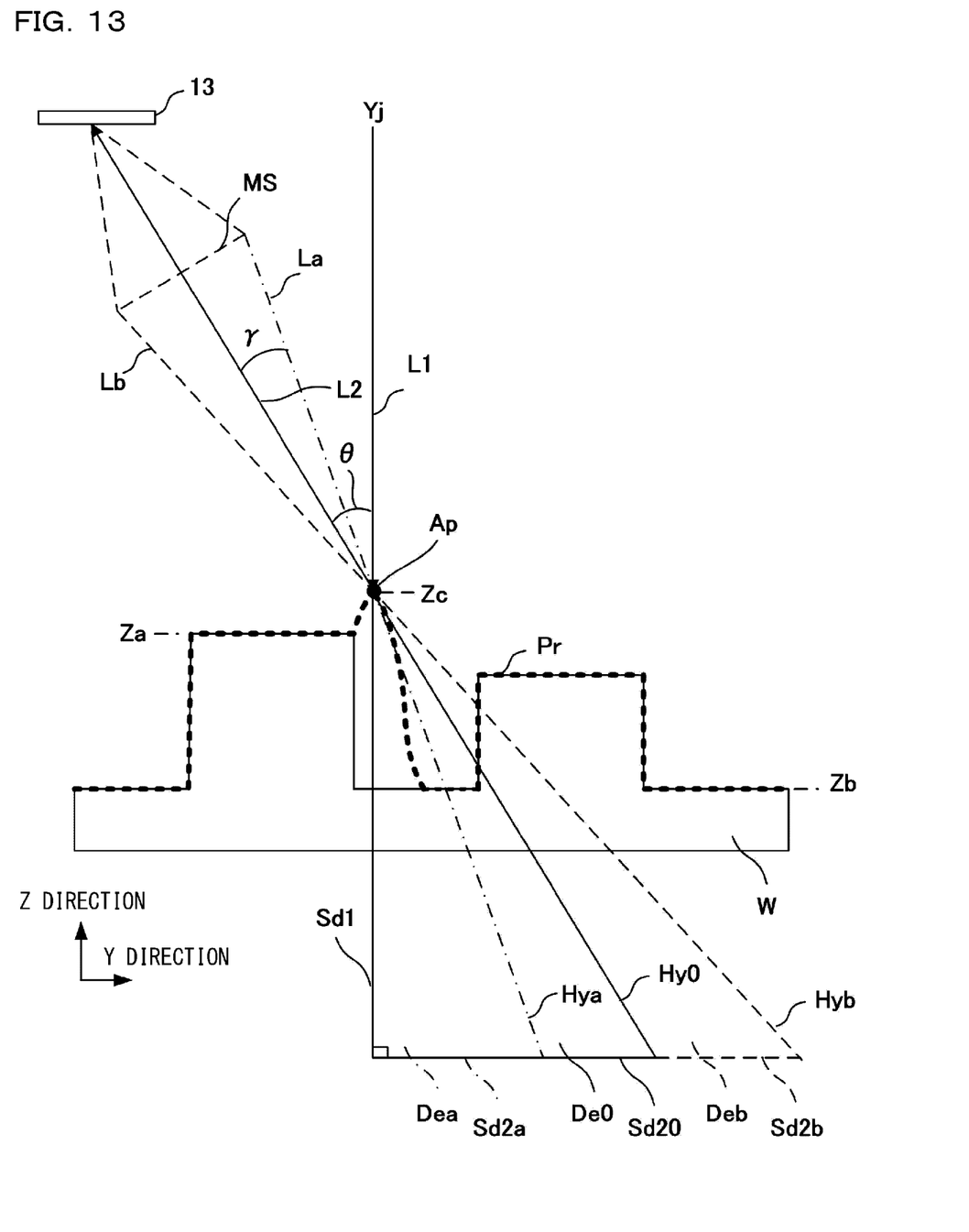
FIG. 13 is a diagram illustrating an adjustment of a blind spot region.

FIG. 13 shows a method of setting the blind spot region De in consideration of the numerical aperture of the light receiving lens 12. As shown in FIG. 13, the light receiving lens 12 has an acceptance angle γ corresponding to the numerical aperture. MS indicates a main surface of the light receiving lens 12. Here, the acceptance angle γ is an angle formed between the optical axis of the light receiving lens 12 and a straight line La. An angle formed between the optical axis of the light receiving lens 12 and a straight line Lb is also the acceptance angle γ. FIG. 13 shows, as a right-angled triangle including the vertex Ap, a blind spot region De0 having a hypotenuse parallel to the optical axis of the light receiving lens 12, a blind spot region Dea having the straight line La as the hypotenuse, and a blind spot region Deb having the straight line Lb as the hypotenuse. In other words, the blind spot region De0 is formed by the first side Sd1, a second side Sd20, and a hypotenuse Hy0. The blind spot region Dea is formed by the first side Sd1, a second side Sd2a, and a hypotenuse Hya. The blind spot region Deb is formed by the first side Sd1, a second side Sd2b, and a hypotenuse Hyb. The vertex angle of the blind spot region De0 at the vertex Ap is θ. The vertex angle of the blind spot region Deb at the vertex Ap is θ+γ. The vertex angle of the blind spot region Dea at the vertex Ap is θ−γ.

As shown in FIG. 13, an area Sa of the blind spot region Dea is the smallest, and an area Sb of the blind spot region Deb is the largest. An area S0 of the blind spot region De0 is larger than the area Sa and smaller than the area Sb. The setting section 28 sets the blind spot region De within a range from the blind spot region Deb to the blind spot region Dea. The setting section 28 may set the blind spot region De within the range from the blind spot region Deb to the blind spot region Dea based on a setting angle δ (δ is a range from −γ to +γ) input from the operating section 5. The setting angle δ is an angle relative to the optical axis (central axis of the reflected light L2) of the light receiving lens. That is, the area S of the blind spot region De increases as the setting angle δ approaches −γ. The area S of the blind spot region De decreases as the setting angle δ approaches +γ. The user may adjust the setting angle δ while viewing the three-dimensional shape of the workpiece W displayed on the display section 3. In other words, the CPU 25 sets a blind spot region according to the setting angle δ set by the user, sets the right-angled triangular blind spot region De with the attention measurement point as the vertex Ap, and determines whether there is a measurement result of another measurement point in the blind spot region De. When a measurement result of another measurement point exists in the blind spot region De, the CPU 25 deletes or excludes the measurement result of the attention measurement point and corrects the data of the three-dimensional shape. When the setting angle δ is changed, the CPU 25 executes again the processing from the setting of the blind spot region De to the correction of the data of the three-dimensional shape.

<Flow Chart>

Figure 14:
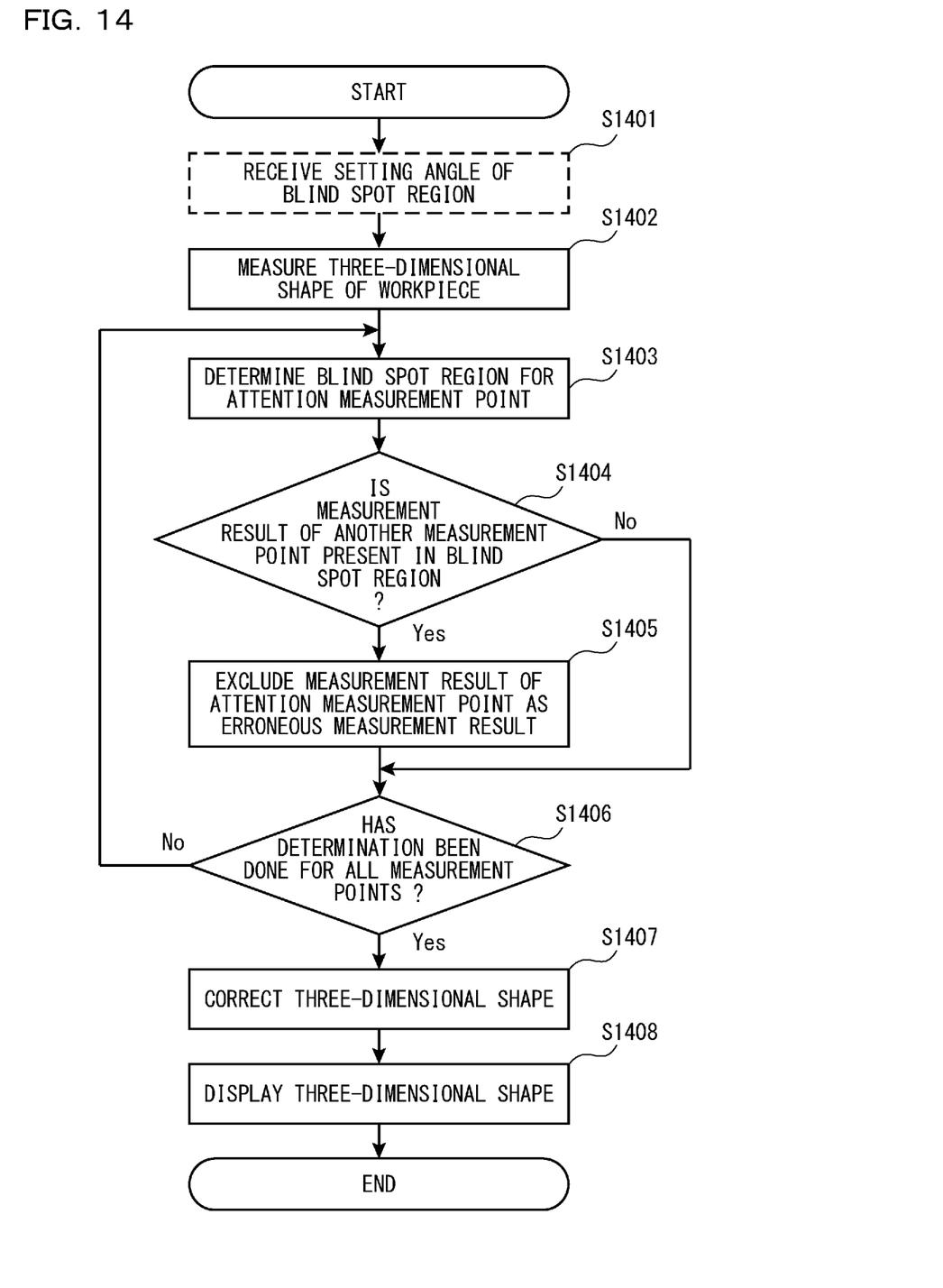
FIG. 14 is a flow chart illustrating a measuring method.

FIG. 14 shows a method of measuring a three-dimensional shape executed by the CPU 25 according to a control program. The control program is stored in an ROM region of the storing section 30.

In S1401, the CPU 25 may receive the setting angle γ of the blind spot region De through the operating section 5. S1401 is optional. When S1401 is not adopted, the setting angle γ is 0.

In S1402, the CPU 25 (the peak detecting section 26 and the profile generating section 27) controls the head section 1 and measures the three-dimensional shape of the workpiece W. As described above, the CPU 25 causes the image sensor 13 to acquire an image of the workpiece W while the belt conveyer 4 conveys the workpiece W in the Y direction. The peak detecting section detects a peak position from the image. The profile generating section 27 generates profile data which is an aggregate of data of a plurality of peak positions. Further, the profile generating section 27 generates data of the three-dimensional shape which is an aggregate of a plurality of profile data. The data of the three-dimensional shape is stored in an RAM region of the storing section 30 and is used by the CPU 25. At this point, the three-dimensional shape of the workpiece W displayed on the display section 3 may include an erroneous measurement result as shown in FIG. 7. The data of the three-dimensional shape may be expressed, for example, as (xi, yj, zij). Here, zij indicates a height where the position in the X direction is xi and the position in the Y direction is yj. Here, i and j are indexes. For example, when the number of measurement points in the X direction is N, i is a value from 1 to N. When the number of measurement points in the Y direction is M, j is a value from 1 to M.

In S1403, the CPU 25 (the setting section 28) determines the blind spot region De for the attention measurement point among the plurality of measurement points included in the data of the three-dimensional shape. The CPU 25 sets i of (xi, yj, zij) to 1, and sets the coordinates of the attention measurement point in order by changing j from 1 to M one by one. Every time j is incremented by one, S1403 to S1406 are repeatedly executed. Next, the CPU 25 sets i of (xi, yj, zij) to 2, and sets the coordinates of the attention measurement point in order by changing j from 1 to M one by one. Finally, the CPU 25 sets i of (xi, yj, zij) to N, and sets the coordinates of the attention measurement point in order by changing j from 1 to M one by one. In this way, it is determined whether the measurement value of the height is correct or incorrect for each of the N×M measurement points arranged in the XY plane. As described above, the setting section 28 determines the blind spot region De having the coordinate (xi, yj, zij) of the attention measurement point as the vertex Ap. The blind spot region De is set in parallel with the YZ plane.

In S1404, the CPU 25 (the determining section 29) determines whether there is a coordinate (a measurement result) of another measurement point in the blind spot region De. When there is a coordinate (a measurement result) of another measurement point in the blind spot region De, the CPU 25 proceeds to S1405. When there is no coordinate (measurement result) of another measurement point in the blind spot region De, the CPU 25 skips S1405 and proceeds to S1406.

In S1405, the CPU 25 (the deleting section 31) determines that the measurement result of the attention measurement point is an erroneous measurement result, and excludes the measurement result of the attention measurement point.

In S1406, the CPU 25 determines whether the determination for the blind spot region has been completed with all the measurement points included in the data of the three-dimensional shape as the attention measurement points. The CPU 25 proceeds to S1403 if the determination has not been completed for all the measurement points. The CPU 25 executes S1403 to S1406 for the next attention measurement point. The CPU 25 proceeds to S1407 when the determination is completed for all the measurement points.

In S1407, the CPU 25 (the profile generating section 27 and the deleting section 31) corrects the data of the three-dimensional shape. The deleting section 31 deletes the measurement result excluded from the data of the three-dimensional shape, and reconstructs the data of the three-dimensional shape. For example, the data of the three-dimensional shape may include coordinate data of the three-dimensional shape obtained by an interpolation calculation from the measurement result and a measurement result of an adjacent measurement point. In this case, the profile generating section 27 may generate corrected data of the three-dimensional shape by executing the interpolation calculation on remaining data of the three-dimensional shape from which the erroneous measurement result has been deleted. Alternatively, the deleting section 31 may simply delete the measurement result excluded from the data of the three-dimensional shape.

In S1408, the CPU 25 displays the data of the three-dimensional shape on the display section 3. As shown in FIG. 11, the three-dimensional shape of the workpiece W from which an erroneous measurement result has been deleted is displayed on the display section 3.

<Summary>

[Viewpoint 1]

As shown in FIG. 1, the optical displacement meter 100 is an example of an optical displacement meter of a light sectioning method that measures a profile of the X-Z cross section of a measuring object conveyed in the Y direction based on the principle of triangulation. The light source 6 functions as a light source that irradiates the measuring object (the workpiece W) with the slit light L1 having a width in the X direction. Further, the light source 6 is an example of a light source that irradiates the measuring object with slit light having a width in the X direction. Moreover, the light source 6 may function as a light projecting section that scans slit light or spot light having a width in an X direction to irradiate the measuring object. The image sensor 13 is an example of an image sensor that receives the reflected light L2 from the measuring object, the image sensor having a plurality of pixels two-dimensionally arranged in the U direction corresponding to the X direction and the V direction corresponding to the Z direction, and outputting a light receiving amount of the reflected light by the plurality of pixels. The peak detecting section 26 functions as a detecting unit that detects, as a peak position, a position of a pixel in the V direction that is a peak of the light receiving amount for each of the plurality of pixel rows arranged in the U direction. The profile generating section 27 functions as a measuring unit that generates, from each position of the plurality of pixel rows in the U direction and the peak position in the V direction, a plurality of profiles of the X-Z cross section, acquires the plurality of profiles at different positions in the Y direction, and measures a three-dimensional shape of the measuring object based on the acquired plurality of profiles. The determining section 29 functions as a determining unit that determines, based on whether a profile exists in the blind spot region De in which it is impossible to measure a height which occurs in the Y-Z cross section corresponding to the angle θ formed between the light projecting axis of the light source 6 and the light receiving axis of the image sensor 13 based on the principle of triangulation, a part of the three-dimensional shape generated by the measuring unit as an erroneous detection value. As described above, according to the present embodiment, a concept of the blind spot region De is introduced, and thus an erroneous profile (measurement result) based on the principle of triangulation can be determined in the optical displacement meter 100 of the light sectioning method.

[Viewpoint 2]

The deleting section 31 functions as a deleting unit that deletes the measurement result (a part of the profile) which has been determined as an erroneous detection value by the determining unit. The profile generating section 27 may measure (acquire) a three-dimensional shape of the measuring object excluding the erroneous detection value from the three-dimensional shape. In this way, a more accurate three-dimensional shape of the workpiece W will be obtained. That is, the measurement accuracy of the workpiece W will be improved.

[Viewpoint 3]

The light receiving lens 12 functions as a light receiving lens that makes the reflected light L2 from the measuring object form an image on the light receiving surface of the image sensor 13. The setting section 28 functions as a blind spot region determining unit that determines, based on a height of the measuring object at an attention measurement point among a plurality of measurement points arranged in the Y direction, the light receiving axis of the light receiving lens 12, and the light projecting direction of the light source, the blind spot region De for the attention measurement point. The determining section 29 may determine the erroneous detection value based on whether a height of the measuring object at measurement points measured before and after the attention measurement point belongs to the blind spot region De.

[Viewpoint 4]

The normal direction of the image sensor 13 may be consistent with the optical axis of the light receiving lens 12. As shown in FIG. 8, FIG. 9, and FIG. 13, the blind spot region De may be a right-angled triangle having the attention measurement point as one vertex Ap. Of the first side and the second side forming the right angle in the right-angled triangle, the first side is parallel to the Z direction, and the second side is parallel to the Y direction. The hypotenuse of the right-angled triangle may be parallel to the optical axis of the light receiving lens 12. In FIG. 8, etc., the hypotenuse of the right-angled triangle is a line segment of a straight line obtained by extending the optical axis of the light receiving lens 12.

[Viewpoint 5]

As shown in FIG. 13, the hypotenuse of the right-angled triangle may have a vertex angle determined by the numerical aperture of the light receiving lens 12, and may be positioned between two equal sides of an isosceles triangle having the attention measurement point as a vertex. According to FIG. 13, an isosceles triangle is formed by the straight line representing the main surface MS of the light receiving lens 12, the straight line La, and the straight line Lb. The angle of the vertex angle of the isosceles triangle is $2\gamma$. Further, the two equal sides correspond to a line segment of the straight line La and a line segment of the straight line Lb. The hypotenuse of the right-angled triangle is adjusted by adjusting the setting angle $\delta$ between $-\gamma$ and $+\gamma$. That is, the blind spot region De is adjusted. In this way, the user will be able to adjust the blind spot region De such that unnecessary measurement results are excluded while correct measurement results are remained.

The invention is not limited to the above embodiment, and various modifications and/or changes are possible within the scope of the gist of the invention.

What is claimed is:

1. An optical displacement meter of a light sectioning method which measures a profile of an X-Z cross section of a measuring object conveyed in a Y direction based on a principle of triangulation, the optical displacement meter comprising:
   a light projecting section that scans slit light or spot light having a width in an X direction to irradiate the measuring object;
   an image sensor that receives reflected light from the measuring object, the image sensor having a plurality of pixels two-dimensionally arranged in a U direction corresponding to the X direction and a V direction corresponding to a Z direction, and outputting a light receiving amount of the reflected light by the plurality of pixels;
   a detecting unit that detects, as a peak position, a position of a pixel in the V direction that is a peak of the light receiving amount for each of a plurality of pixel rows arranged in the U direction;
   a measuring unit that acquires, from each position of the plurality of pixel rows in the U direction and the peak position in the V direction, a plurality of profiles of the X-Z cross section at different positions in the Y direction, and measures a three-dimensional shape of the measuring object based on the acquired plurality of profiles; and
   a determining unit that determines, based on whether a profile exists in a blind spot region in which it is impossible to measure a height which occurs in a Y-Z cross section corresponding to an angle formed between a light projecting axis of the light projecting section and a light receiving axis of the image sensor based on the principle of triangulation, a part of the three-dimensional shape generated by the measuring unit as an erroneous detection value.

2. The optical displacement meter according to claim 1, further comprising a deleting unit that deletes the part of the profile which has been determined as an erroneous detection value by the determining unit; and
   the measuring unit measures a three-dimensional shape of the measuring object excluding the erroneous detection value from the three-dimensional shape.

3. The optical displacement meter according to claim 1, further comprising a light receiving lens that makes reflected light from the measuring object form an image on a light receiving surface of the image sensor; and
   a blind spot region determining unit that determines a blind spot region for an attention measurement point based on a height of the measuring object at the attention measurement point among a plurality of measurement points arranged in the Y direction, a light receiving axis of the light receiving lens, and a light projecting direction of the light projecting section;
   wherein the determining unit determines the erroneous detection value based on whether a height of the measuring object at measurement points measured before and after the attention measurement point belongs to the blind spot region.

4. The optical displacement meter according to claim 3, wherein the blind spot region is a right-angled triangle having the attention measurement point as one vertex, and of a first side and a second side forming a right angle in the right-angled triangle, the first side is parallel to the Z direction, the second side is parallel to the Y direction, and a hypotenuse of the right-angled triangle is parallel to an optical axis of the light receiving lens.

5. The optical displacement meter according to claim 3, wherein the blind spot region is a right-angled triangle having the attention measurement point as one vertex, and of a first side and a second side forming a right angle in the right-angled triangle, the first side is parallel to the Z direction, the second side is parallel to the Y direction, and a hypotenuse of the right-angled triangle has a vertex angle determined by a numerical aperture of the light receiving lens and is positioned between two equal sides of an isosceles triangle having the attention measurement point as a vertex.

* * * * *